United States Patent
Bohling et al.

(10) Patent No.: US 11,312,868 B2
(45) Date of Patent: Apr. 26, 2022

(54) AQUEOUS DISPERSION OF MICROSPHERES P-ACID FUNCTIONALIZED POLYMER PARTICLES

(71) Applicants: Rohm and Haas Company, Collegeville, PA (US); Dow Global Technologies LLC, Midland, MI (US)

(72) Inventors: James C. Bohling, Landsdale, PA (US); Ibrahim Eryazici, Phoenixville, PA (US); Philip R. Harsh, Birdsboro, PA (US); Partha S. Majumdar, Harleysville, PA (US); Edwin Aloysius Nungesser, Jr., Horsham, PA (US); Qing Zhang, Collegeville, PA (US)

(73) Assignees: Rohm and Haas Company, Collegeville, PA (US); Dow Global Technologies, LLC., Midland (ML)

( * ) Notice: Subject to any disclaimer, the term of this patent is extended or adjusted under 35 U.S.C. 154(b) by 209 days.

(21) Appl. No.: 16/214,970

(22) Filed: Dec. 10, 2018

(65) Prior Publication Data
US 2019/0177554 A1    Jun. 13, 2019

Related U.S. Application Data

(60) Provisional application No. 62/638,994, filed on Mar. 6, 2018, provisional application No. 62/598,072, filed on Dec. 13, 2017.

(51) Int. Cl.
*C09D 5/02* (2006.01)
*C09D 7/62* (2018.01)
*C09D 7/63* (2018.01)
*C09D 7/40* (2018.01)
*C09D 7/65* (2018.01)
*C09D 133/10* (2006.01)
*C09D 5/00* (2006.01)
*C08K 5/521* (2006.01)
*C08L 33/10* (2006.01)
*C08K 3/22* (2006.01)

(52) U.S. Cl.
CPC ............. *C09D 5/028* (2013.01); *C09D 5/00* (2013.01); *C09D 7/62* (2018.01); *C09D 7/63* (2018.01); *C09D 7/65* (2018.01); *C09D 7/67* (2018.01); *C09D 7/69* (2018.01); *C09D 7/70* (2018.01); *C09D 133/10* (2013.01); *C08K 3/22* (2013.01); *C08K 5/521* (2013.01); *C08K 2003/2241* (2013.01); *C08L 33/10* (2013.01)

(58) Field of Classification Search
None
See application file for complete search history.

(56) References Cited

U.S. PATENT DOCUMENTS

| | | |
|---|---|---|
| 7,768,602 B2 | 8/2010 | LaFleur et al. |
| 7,829,626 B2 | 11/2010 | Chiou et al. |
| 8,436,096 B2 | 5/2013 | LaFleur et al. |
| 8,563,130 B2 | 10/2013 | Chung et al. |
| 8,778,493 B2 | 7/2014 | LaFleur et al. |
| 8,900,669 B2 | 12/2014 | LaFleur et al. |
| 9,155,549 B2 | 10/2015 | Fasula et al. |
| 9,410,053 B2 | 8/2016 | Kamel et al. |
| 9,458,347 B2 | 10/2016 | LaFleur et al. |
| 9,636,706 B2 | 5/2017 | Jiang et al. |
| 9,645,289 B2 | 5/2017 | Nungesser et al. |
| 9,850,396 B2 | 12/2017 | Xu et al. |
| 9,856,369 B2 | 1/2018 | Lundgard et al. |
| 2003/0224184 A1* | 12/2003 | Hermes ............... C09D 5/004 428/447 |
| 2006/0223911 A1* | 10/2006 | Bardman ............ C08K 3/013 523/200 |
| 2013/0005245 A1 | 1/2013 | Royston |
| 2013/0053499 A1 | 2/2013 | Donovan et al. |
| 2016/0369359 A1 | 12/2016 | Gallagher et al. |
| 2017/0058116 A1* | 3/2017 | Ando ............... C08G 18/6225 |
| 2017/0058371 A1* | 3/2017 | Eryazici ............ C09D 175/04 |
| 2017/0210931 A1 | 7/2017 | Bohling et al. |
| 2018/0223026 A1 | 8/2018 | LaFleur et al. |
| 2018/0327562 A1 | 11/2018 | Beshah et al. |

FOREIGN PATENT DOCUMENTS

| | | |
|---|---|---|
| CN | 105713496 A | 6/2016 |
| WO | 2018071088 | 4/2018 |

OTHER PUBLICATIONS

U.S. Appl. No. 16/115,738, filed Aug. 29, 2018, James C Bohling et al., Entitled: Process for Preparing an Aqueous Dispersion of Polymeric Microspheres.

\* cited by examiner

*Primary Examiner* — Ronak C Patel
(74) *Attorney, Agent, or Firm* — Reid S. Willis

(57) ABSTRACT

The present invention relates to a pigmented matte coating composition comprising an aqueous dispersion of a) phosphorus acid functionalized polymer particles; b) TiO₂ particles; c) polymeric organic microspheres; and d) a rheology modifier. The composition of the present invention gives matte finish coatings having the stain and scrub resistant attributes similar to coatings formed from semi-gloss paint compositions.

12 Claims, No Drawings

AQUEOUS DISPERSION OF MICROSPHERES P-ACID FUNCTIONALIZED POLYMER PARTICLES

BACKGROUND OF THE INVENTION

The present invention relates to an aqueous dispersion of microspheres and phosphorus acid functionalized polymer particles, which is useful in coatings formulations. The formulation is useful as a pigmented matted coating composition.

It is highly desirable to have the performance attributes of a semi-gloss coating with the sheen of a traditional matte pigmented coating. Matte coatings are desirable for their ability to obscure surface imperfections in both a substrate and the coating covering it. The control of gloss is critical in the design of low sheen decorative paints. Traditionally, lower sheen paints control the gloss by the addition of matting agents, also known as extenders or dulling agents. Typically, these matting agents are inorganic particles of calcium carbonate, silica, and the like, that lower the sheen by increasing the surface roughness of the film. The overall roughness of the film significantly increases the degree of light scattering, which, in turn lowers the sheen of the overall film. While effective at reducing the sheen, the inorganic particles compromise the durability and performance of the resulting film. Properties such as stain resistance can be particularly compromised through the use of large inorganic extenders.

Accordingly, it would be advantageous to design a low sheen coating that eliminates or significantly reduces the required amount of inorganic matting agents, thereby providing coatings with matte appearance and higher performance.

SUMMARY OF THE INVENTION

The present invention addresses a need in the art by providing a pigmented matte coating composition comprising an aqueous dispersion of a) phosphorus acid functionalized polymer particles; b) $TiO_2$ particles; c) polymeric organic microspheres; and d) a rheology modifier; wherein the concentration of the phosphorus acid functionalized polymer particles is in the range of from 4 to 35 weight percent, based on the weight of the composition;

the average particle size of the phosphorus acid functionalized polymer particles is in the range of from 80 nm to 500 nm;

the concentration of the polymeric organic microspheres is in the range of from 4 to 30 weight percent, based on the weight of the composition;

the average particle size of the organic microspheres is in the range of from 1 µm to 20 µm;

the rheology modifier is present at a concentration in the range of from 0.1 to 5 weight percent, based on the weight of the composition;

the $TiO_2$ is present at a concentration in the range of from 14 to 32 weight percent based on the weight of the composition;

at least some of the phosphorus acid functionalized polymer particles are adsorbed to the $TiO_2$ particles; and the polymeric organic microspheres are not film-forming at ambient temperature.

The present invention addresses a need by providing a composition that gives a matte finish with the properties of a semi-gloss painted substrate.

DETAILED DESCRIPTION OF THE INVENTION

The present invention is a pigmented matte coating composition comprising an aqueous dispersion of a) phosphorus acid functionalized polymer particles; b) $TiO_2$ particles; c) polymeric organic microspheres; and d) a rheology modifier; wherein the concentration of the phosphorus acid functionalized polymer particles is in the range of from 4 to 35 weight percent, based on the weight of the composition;

the average particle size of the phosphorus acid functionalized polymer particles is in the range of from 80 nm to 500 nm;

the concentration of the polymeric organic microspheres is in the range of from 4 to 30 weight percent, based on the weight of the composition;

the average particle size of the organic microspheres is in the range of from 1 µm to 20 µm;

the rheology modifier is present at a concentration in the range of from 0.1 to 5 weight percent, based on the weight of the composition;

the $TiO_2$ is present at a concentration in the range of from 14 to 32 weight percent based on the weight of the composition;

at least some of the phosphorus acid functionalized polymer particles are adsorbed to the $TiO_2$ particles; and the polymeric organic microspheres are not film-forming at ambient temperature.

The phosphorus acid functionalized polymer particles are preferably acrylic based, meaning these polymer particles comprise at least 30 weight percent, based on the weight of the polymer particles, of structural units of one or more methacrylate monomers such as methyl methacrylate and ethyl methacrylate, and/or one or more acrylate monomers such as ethyl acrylate, butyl acrylate, 2-propylheptyl acrylate, and 2-ethylhexyl acrylate. The acrylic-based polymers may also include structural units of ethylenically unsaturated acid monomers such as methacrylic acid, acrylic acid, and itaconic acid, or salts thereof, as well as other non-acrylate or methacrylate monomers such as styrene and vinyl acetate.

Preferably, the polymer particles further comprise from 0.05 to 12 weight percent structural units of a monomer with keto functionality, including acetoacetoxyethyl methacrylate (AAEM) or diacetone acrylamide (DAAM), preferably at a concentration in the range of from 0.5 to 5 weight percent, based on the weight of the polymer particles and microspheres.

If the polymer particles are functionalized with structural units of a monomer with keto functionality, the composition advantageously includes from 0.1, preferably from 0.2, and more preferably from 0.5 weight percent, to 10, and preferably to 5 weight percent, based on the weight of the polymer particles and microspheres, of a dihydrazide or polyamine crosslinking agent. Examples of polyamine crosslinking agents include diamines such as 3,3'-(ethane-1,2-diylbis(oxy))bis(propan-1-amine); 4,9-dioxadodecane-1,12-diamine; 4,9-dioxadodecane-1,12-diamine; 4,7-dioxadodecane-1,10-diamine; and 4,7,10-trioxatridecane-1,13-diamine. Commercial examples of polyamines are polyetheramines such as JEFFAMINE D-230, JEFFAMINE D-400, JEFFAMINE D-2000, JEFFAMINE M-600, JEFFAMINE M-1000, JEFFAMINE ED-600, JEFFAMINE ED-900, T-403, and JEFFAMINE T-3000 polyetheramines. When the monomer with keto functionality is DAAM, the composition preferably includes a dihydrazide crosslinking agent, such as adipic acid dihydrazide (ADH), carbodihydrazide (CDH), sebacic acid dihydrazide (SDH), valine dihydrazide (VDH), isophthalic dihydrazide (ISODH), and icosanedioic hydrazide ICODH). Preferably, the crosslinking agent for DAAM functionalized polymer particles is a dihydrazide, more preferably ADH.

The term "structural unit" is used herein to describe the remnant of the recited monomer after polymerization. For example, a structural unit of methyl methacrylate is as illustrated:

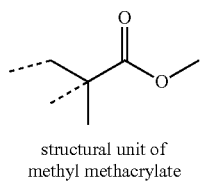

structural unit of
methyl methacrylate where the dotted lines represent the points of attachment of the structural unit to the polymer backbone.

Preferably, the polymer particles are functionalized with from 0.1, more preferably from 0.2, and most preferably from 0.3 weight percent, to 5, more preferably to 4, and most preferably to 3 weight percent structural units of a phosphorus acid monomer, based on the weight of the polymer particles. Examples of suitable phosphorus acid monomer include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates.

The concentration of phosphorus acid functionalized polymer particles is preferably in the range of from 10, more preferably from 15 weight percent, to 30, more preferably to 25 weight percent, based on the weight of the composition. Preferably, the average particle size of the phosphorus acid functionalized polymer particles is in the range of from 100 nm to 300 nm, more preferably to 250 nm as measured using a Brookhaven BI90 particle analyzer.

At least some of the phosphorus acid functionalized polymer particles, preferably at least 20 weight percent as measured by Scanning Electron Microscopy/Energy Dispersive X-Ray Spectroscopy (SEM/EDS), are adsorbed onto $TiO_2$ particles to form a composite. The average particle size of the $TiO_2$ particles, as measured using a Brookhaven B190 particle analyzer, is preferably in the range of from 200 nm, more preferably from 250 nm, to 400 nm, more preferably to 350 nm, and most preferably to 300 nm; the concentration of the $TiO_2$ particles is preferably in the range of from 16, more preferably from 18, to 28, more preferably to 26, and most preferably to 24 weight percent, based on the weight of the composition.

The polymeric organic microspheres are preferably multistage crosslinked microspheres preferably having an average particle size (technically, a median weight average particle size, $D_{50}$) in the range of from 2 μm, more preferably from 4 μm, to preferably 15 μm, more preferably to 13 μm, and most preferably to 10 μm, as measured using Disc Centrifuge Photosedimentometer as described hereinbelow. The concentration of the polymeric organic microspheres is preferably in the range of from 5, and more preferably from 8 weight percent to preferably 25, more preferably 20 weight percent, based on the weight of the composition. Aqueous dispersions of multistage crosslinked microspheres can be prepared in a variety of ways, including those described in US Pat. Pub. 2013/0052454; U.S. Pat. Nos. 4,403,003; 7,768,602; and 7,829,626.

In a preferred method of preparing an aqueous dispersion of polymeric organic crosslinked multistage microspheres (Preferred Method A), an aqueous dispersion of first microspheres comprising structural units of a first monoethylenically unsaturated nonionic monomer is contacted under polymerization conditions with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 μm to 15 μm and the second microspheres have a particle size in the range of from 1.1 μm and 25 μm; and wherein the polymerizable organic phosphate is represented by the structure of Formula I:

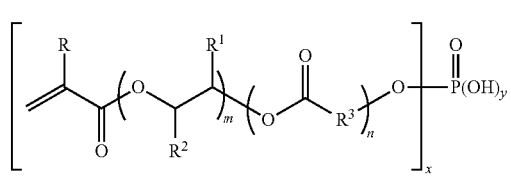

or a salt thereof; wherein R is H or $CH_3$, wherein $R^1$ and $R^2$ are each independently H or $CH_3$, with the proviso that no two adjacent $CR^2CR^1$ groups are each substituted with methyl groups;

each $R^3$ is independently linear or branched $C_2$-$C_6$ alkylene; m is from 1 to 10; n is from 0 to 5 with the proviso that when m is 1, n is 1 to 5; x is 1 or 2; and y is 1 or 2; and x+y=3. The resultant microspheres prepared by this method are functionalized preferably with from 0.05 to 5 weight percent, based on the weight of the microspheres, of structural units of Formula I or a salt thereof.

When n is 0, x is 1, and y is 2, the polymerizable organic phosphate or salt thereof is represented by the structure of Formula II:

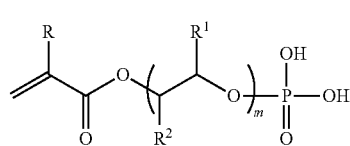

Preferably, one of $R^1$ and $R^2$ is H, and the other of $R^1$ and $R^2$ is $CH_3$; more preferably, each $R^2$ is H and each $R^1$ is $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

In another aspect, where n is 1; m is 1; R is $CH_3$; $R^1$ and $R^2$ are each H; $R^3$—$(CH_2)_5$—; x is 1 or 2; y is 1 or 2; and x+y=3, the polymerizable organic phosphate or salt thereof is represented by the Structure of Formula III:

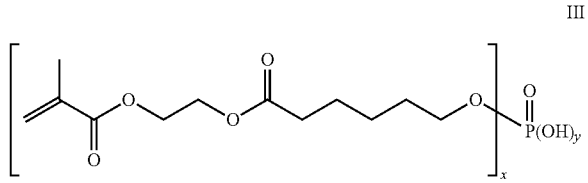

A commercially available compound within the scope of Formula III is Kayamer PM-21 phosphate ester.

In this method, the first microspheres preferably comprise from 90 to 99.9 weight percent structural units of a monoethylenically unsaturated nonionic monomer, examples of which include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the first microspheres to include structural units of carboxylic acid monomers such as methacrylic acid or acrylic acid, it is preferred that the first microspheres comprise less than 5, more preferably less than 3, and most preferably less than 1 weight percent structural units of a carboxylic acid monomer, based on the weight of the microspheres. The first microspheres more preferably comprise structural units of acrylates or methacrylates or combinations of acrylates and methacrylates.

The first microspheres are advantageously prepared from an aqueous dispersion of an oligomeric seed having a weight average molecular weight ($M_w$) in the range of from 800, preferably from 1000 g/mol to 20,000, preferably to 10,000 and most preferably to 5000 g/mol as determined by size exclusion chromatography using polystyrene standards as described herein. The oligomeric seed has an average diameter in the range of from 200 nm, more preferably from 400 nm, and most preferably from 600 nm, to 8000 nm, preferably to 5000 nm, more preferably to 1500 nm, and most preferably to 1000 nm, as determined by disc centrifuge DCP, as described herein. The oligomeric seed contains a structural of a chain transfer agent such as an alkyl mercaptan, examples of which include n-dodecyl mercaptan, 1-hexanethiol, 1-octane thiol, and 2-butyl mercaptan.

The oligomeric seed is advantageously contacted with a monomer in the presence of a hydrophobic initiator, in any order, to transport the initiator into the seed, or seed swollen with monomer. As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). The extent of swelling (seed growth) can be controlled by the ratio of the monomer to the seed. Examples of suitable monoethylenically unsaturated nonionic monomers include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate.

Forming microspheres from oligomeric seed provides an effective way of controlling the particle size distribution of the microspheres. Preferably, the coefficient of variation of the first and the second microspheres, as determined by DCP, is less than 25%, more preferably less than 20%, more preferably less than 15%, and most preferably less than 10%. Preferably, the concentration of gel formed in the process of preparing the aqueous dispersion of second microspheres is preferably less than 0.5, more preferably less than 0.2, more preferably less than 0.1, and most preferably less 0.05 weight percent, based on the weight of the aqueous dispersion. Dispersions of microspheres with low coefficients of variation ultimately result in coatings with reliable and reproducible properties in end-use applications. In contrast, microspheres with coefficients of variation greater than 30% give coatings with unreliable and unpredictable properties.

Preferably, the particle size of the first microspheres is in the range of from 2.5 µm, more preferably from 3.0 µm, preferably to 12 µm, more preferably to 10 µm, and most preferably to 8.5 µm.

In a preferred process of preparing an aqueous dispersion of microspheres functionalized with the polymerizable organic phosphate of Structure I, the aqueous dispersion of first microspheres is contacted under polymerization conditions and in the presence of an emulsifying surfactant, such as a phosphate or an alkyl benzene sulfonate or sulfate, with first stage monomers comprising, based on the weight of the first stage monomers, from 0.05, preferably from 0.1, and more preferably from 0.2 weight percent, to 5, preferably to 3, more preferably to 2, and most preferably to 1 weight percent of the polymerizable organic phosphate of Structure I or a salt thereof; and from 70, more preferably from 80, and most preferably from 90 weight percent, to 99.95, preferably to 99.8 weight percent of a second monoethylenically unsaturated nonionic monomer. The first microspheres increase in volume (grow out) to form an aqueous dispersion of organic phosphate functionalized second microspheres having a particle size in the range of from 1.1 µm, and preferably from 2.5 µm, preferably from 3.5 µm, to 25 µm, more preferably to 20 µm, and most preferably to 15 µm.

The first stage monomer preferably further comprises a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of first stage monomers. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The inclusion of these multiethylenically unsaturated nonionic monomers is particularly preferred where further staging of the organic phosphate functionalized second microspheres is desired.

The first stage monomer as well as the second microspheres preferably comprises a substantial absence of structural units of a carboxylic acid monomer. As used herein, a substantial absence of structural units of a carboxylic acid monomer means less than 5, preferably less than 3, more preferably less than 1, and most preferably less than 0.2 weight percent structural units of a carboxylic acid monomer such as methacrylic acid or acrylic acid, based on the weight of the microspheres.

The second microspheres preferably comprise from 90 to 98 weight percent structural units of a second monoethylenically unsaturated nonionic monomer, which may be the same as or different from the first monoethylenically unsaturated nonionic monomer. It is further preferred that a keto-functionalized monomer be included among the second monoethylinically unsaturated monomer in the same concentration range as described for the phosphorus acid functionalized polymer particles. It is understood that "monomer" refers to one or more monomers.

It is preferred that the aqueous dispersion of first microspheres is contacted under polymerization conditions with an excess of the polymerizable organic phosphate (or salt thereof) so that the resultant dispersion of organic phosphate functionalized second microspheres comprises unreacted organic phosphate. The presence of unreacted (carryover) polymerizable organic phosphate or salt thereof is especially advantageous if further staging of the second microspheres is desired. For example, it may be desirable to prepare a dispersion of second microspheres with a $T_g$ of less than 25° C., as calculated by the Fox equation, then further stage the second microspheres with carryover organic phosphate and additional monoethylenically unsaturated nonionic monomer (second stage ethylenically unsaturated nonionic monomer), which may be the same as of different from the first stage monoethylenically unsaturated nonionic monomer, to yield a dispersion of organic phosphate functionalized third microspheres with a domain having a $T_g$ of less than 25° C., and a domain with a $T_g$ of greater than 50° C. The domains may form, for example, a core-shell morphology or a so-called "chocolate chip cookie" morphology. A water-soluble initiator/redox couple such as t-butyl hydroperoxide and isoascorbic acid (t-BHP/IAA) is advantageously used to form a gradient core-shell morphology.

Where initiator/redox couple is used, it has been discovered that further formation of gel is dramatically attenuated if the polymerization is carried out at a pH that is at least one pH unit higher than the first $pK_a$ of the residual polymerizable organic phosphate. Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8. Thus, the polymerizable organic phosphate used to make the aqueous dispersion of third microspheres preferably is predominantly present in the salt form, preferably as the lithium, sodium, potassium, trialkylammonium, or ammonium salt.

Additional polymerizable organic phosphate may be added in the further staging of the second microspheres, preferably in the desired pH range where initiator/coupler is used. It is especially preferred to prepare the microspheres using the salt of Formula II where each $R^2$ is H and each $R^1$ is $CH_3$, or each $R^2$ is $CH_3$ and each $R^1$ is H, or Formula III.

The aqueous dispersion of polymeric microspheres resulting from Preferred Method A comprise crosslinked microspheres functionalized with from 0.05 to 5 weight percent, based on the weight of the microspheres, of structural units of Formula I.

In another preferred method of preparing an aqueous dispersion of polymeric multistage crosslinked microspheres (Preferred Method B), the aqueous dispersion of first microspheres (prepared as described in Preferred Method A) are contacted with the first stage monomer comprising from 70 to 100 weight percent of the second monoethylenically unsaturated nonionic monomer to grow out the first microspheres to form an aqueous dispersion of second microspheres, as described hereinabove, except that the polymerization is carried out in the presence of a nonionic polyalkylene oxide of a distyryl or tristyryl phenol or an anionic polyalkylene oxide salt of a distyryl or tristyryl phenol.

The nonionic polyalkylene oxide or anionic polyalkylene oxide salt of a distyryl or tristyryl phenol is represented by the compound of Formula IV:

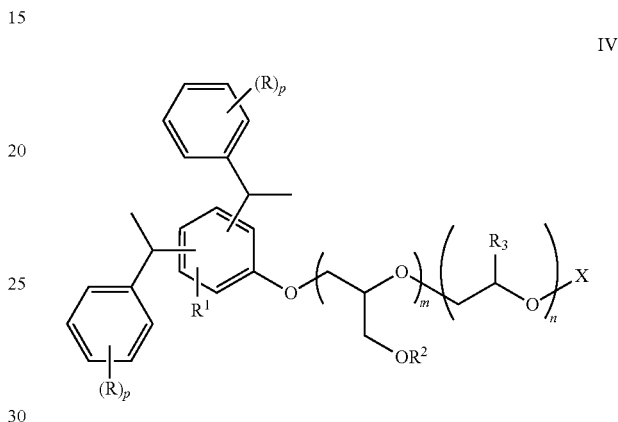

IV where each R is independently $C_1$-$C_4$-alkyl; $R^1$ is H, $CH_2$—CR=$CH_2$, CH=$CHCH_3$, or 1-phenethyl-$(R)_p$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate. Preferably, $R^1$ is 1-phenethyl-$(R)_n$; $R^2$ is preferably H, $CH_3$, or allyl; m is preferably 0, 1, or 2; n is from 10 to 20; p is 0; and O—X is a sulfate or a phosphate. A more preferred polyethylene oxide salt of tristyryl phenol is represented by the compound of Formula V:

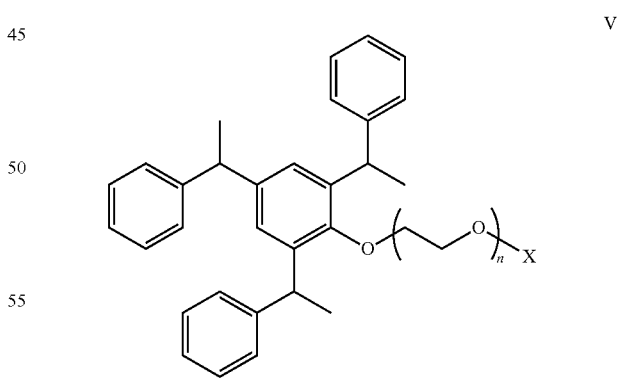

V where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$. An example of a commercially available compound of Formula II is Solvay Soprophor 4D/384 ammonium salt of polyarylphenyl ether sulphate.

Another preferred ethylene oxide salt of distyryl phenol or tristyryl phenol, where m is non-zero, is represented by the compound of Formula VI.

VI

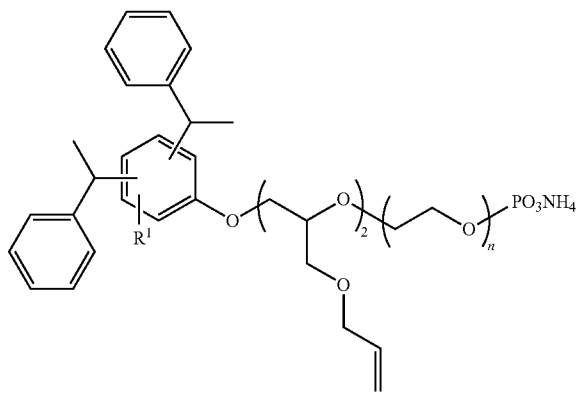

where n is preferably 12 to 18. A commercial example of the compound of Formula VI is E-Sperse RS-1684 reactive surfactant.

Another example of a polyethylene oxide salt of a distyryl phenol is represented by the compound of Formula VII:

VII

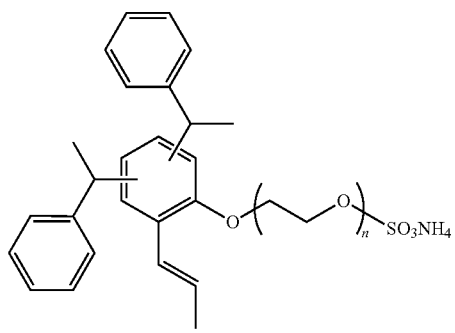

A subclass of compounds of structure IV (m=0) can be prepared by reacting distyryl or tristyryl phenol with an alkylene oxide (ethylene oxide, 1,2-propylene oxide, or 1,2-butylene oxide) in the presence of a base such as an alkali metal or alkaline earth metal hydroxide, carbonate, or bicarbonate, or an alkali metal hydride; this intermediate can then be neutralized to the corresponding glycol, methoxylated with a methyl halide, sulfonated with sulfonyl chloride, or phosphorylated with polyphosphoric acid. A compound of Formula VI can be prepared in the same manner except that the distyryl or tristyryl phenol is first reacted with an epihalohydrin such as epichlorohydrin in the presence of a base to form the corresponding monoglycidyl ether of the distyryl or tristyryl phenol prior to reaction with the alkylene oxide.

It is preferred that the aqueous dispersion of first microspheres is contacted under polymerization conditions with the salt of the compound of Formula V or an excess of the salt of the compound of Formula VI or Formula VII, so that the resultant dispersion of second microspheres preferably comprises the salt of the compound of Formula V or the salt of unreacted compound of Formula VI or Formula VII. The presence of the salt of the compound of Formula V, VI, or VII is especially advantageous if further staging of the second microspheres. For example, it may be desirable to prepare a dispersion of second microspheres with a $T_g$ of less than 25° C., as calculated by the Fox equation, then further stage the second microspheres with the salt of the compound of Formula V, VI, or VII and additional monoethylenically unsaturated nonionic monomer (second stage monoethylenically unsaturated nonionic monomer), which may be the same as of different from first stage monoethylenically unsaturated nonionic monomer, under polymerization conditions to yield a dispersion of third microspheres with a domain having a $T_g$ of less than 25° C., and a domain with a $T_g$ of greater than 50° C. The domains may form, for example, a core-shell morphology or a so-called "chocolate chip cookie" morphology. A water-soluble initiator/redox couple such as t-butyl hydroperoxide and isoascorbic acid (t-BHP/IAA) is advantageously used to form a gradient core-shell morphology.

Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8.

Additional compound of Formula IV, particularly the salt of the compound of Formula IV, may be added in the further staging of the second microspheres, preferably in the desired pH range where initiator/coupler is used.

The particle size and particle size distribution of the microspheres formed by Preferred Method B is similar to the distribution achieved for Preferred Method A. It has been found that formulations containing microspheres with low gel and narrow particle size distribution (low coefficient of variation) are especially effective for controlling haptics of the subsequent coating.

It is also possible and sometimes preferable to prepare a composition with distinctly sized microspheres each with a low coefficient of variation; such a formulation can arise, for example, from the blending of an aqueous dispersion of microspheres having a particle size of 8 μm, and an aqueous dispersion of microspheres having a particle size of 12 μm, each dispersion having a coefficient of variation of <20%, to form a bimodal dispersion microspheres with controlled particle size in both modes.

In a preferred aspect, the aqueous dispersion of polymeric microspheres resulting from Preferred Method B comprises crosslinked microspheres functionalized with from 0.01 to 5 weight percent, based on the weight of the microspheres, of structural units of the compound of formula VI; in another preferred aspect, the composition further comprises from 0.01, preferably from 0.05, more preferably from 0.1, and most preferably from 0.2 weight percent, to 5, preferably to 3, more preferably to 2, and most preferably to 1 weight percent, based on the weight of the microspheres, of the compound of Structure V.

Preferably, polymeric organic microspheres functionalized with structural units of the compound of Formula I, Formula VI, or Formula VII, as well as compositions further comprising the compound of Formula V, comprise a substantial absence of PEM, that is, less than 0.09, more preferably less than 0.05, more preferably less than 0.01, and most preferably 0 weight percent structural units of PEM, based on the weight of the polymeric organic microspheres.

The rheology modifier can be any thickener that is capable of controlling the viscosity of the formulation to the desired levels. Preferably, the concentration of the rheology modifier is in the range of from 0.2, more preferably from 0.5 weight percent, to preferably 3, more preferably to 2 weight percent. Examples of suitable rheology modifiers include hydrophobically modified ethylene oxide urethane polymers (HEURs), hydroxyethylcellulose (HEC), and hydrophobically modified alkali swellable polymers (HASEs).

Inorganic extenders, which are commonly used in pigmented matte finish paints, are effectively replaced by the polymeric organic microspheres, resulting in an improvement in scrub resistance and stain removal properties. Accordingly, the composition of the present invention preferably comprises a substantial absence of inorganic extenders having a refractive index in the range of 1.0 to 1.9, which tend to have an adverse effect on the scrub and stain resistance of the consequent coating. As used herein, "substantial absence" refers to less than 10, preferably less than 5, more preferably less than 1, and most preferably 0 pigment volume concentration (PVC) of any extender having a refractive index in the prescribed range. Examples of extenders substantially absent from the composition include silica, silicates and aluminosilicates such as talc, clay, mica, and sericite; CaCO3; nepheline syenite; feldspar; wollastonite; kaolinite; dicalcium phosphate; and diatomaceous earth. As used herein, extender PVC is defined by the following equation:

$$PVC = \left[\frac{Vol \text{ Solids (Extender)}}{Total \ Vol \text{ Solids}}\right] \times 100$$

where "total solids" includes $TiO_2$, extender, polymer particles, and microspheres, as well as other solids (e.g., opaque polymers) that constitute the volume of the final dried coating.

Similarly, the PVC of $TiO_2$ (Pigment) in the composition is in the range of 12, preferably from 15, to 24, preferably to 22, wherein $TiO_2$ PVC is defined by the following equation:

$$PVC = \left[\frac{Vol \text{ Solids (Pigment)}}{Total \ Vol \text{ Solids}}\right] \times 100$$

The composition of the present invention is conveniently prepared by mixing together an aqueous dispersion of the phosphorus acid functionalized polymer particles (that is, a phosphorus acid functionalized latex), an aqueous dispersion of polymeric organic microspheres, and $TiO_2$, either as a solid or in the form of a slurry, and the rheology modifier. Preferably, the $TiO_2$ is added as a slurry to a pre-mixed aqueous blend of polymer particles and microspheres, followed by addition of the rheology modifier and, optionally other additives selected from the group consisting of coalescents, surfactants, dispersants, biocides, colorants and neutralizing agents.

The composition of the present invention provides a way to make matte finish coatings with the scrub resistance and stain removal attributes of a semi-gloss paint.

EXAMPLES

Molecular Weight Determination of Acrylic Oligomer Seed

The dispersion of acrylic oligomer seed (0.1 g) were dissolved in tetrahydrofuran (THF, 8 g, HPLC grade) then filtered through 0.45 μm PTFE filters. Size Exclusion Chromatography (SEC) separations were carried out on a liquid chromatograph equipped with an Agilent 1100 Model isocratic pump, a vacuum degasser, a variable injection size autosampler, and an Agilent 1100 HPLC G1362A Refractive Index detector. The data was processed with Agilent ChemStation, version B.04.03 and Agilent GPC-Addon version B.01.01. GPC separations were carried out using THF as an eluent at a flow rate of 1 mL/min using a GPC column set composed of two PLgel Mixed D columns (300×7.5 mm ID, 5 μm) and a guard column (50×7.5 mm ID, 5 μm). Ten polystyrene standards were fitted with a 1st order fit calibration curve. The weight average molecular weights ($M_w$) of the standards were as follows: 630; 1,370; 2,930; 4,900; 10,190; 22,210; 50,550; 111,400; 214,700; and 363,600. Data was collected using a refractive index (RI) detector.

DCP Particle Sizing Methods for Acrylic Oligomer Seed and Microspheres

Particle sizes and distribution were measured using Disc Centrifuge Photosedimentometer (DCP, CPS Instruments, Inc., Prairieville, La.) that separates modes by centrifugation and sedimentation through a sucrose gradient. The samples were prepared by adding 1 to 2 drops of the oligomer seed dispersion or the microsphere dispersion into 10 mL of deionized (DI) water containing 0.1% sodium lauryl sulfate, followed by injection of 0.1 mL of the sample into a spinning disc filled with 15 g/mL of sucrose gradient. For the oligomer seed, a 0-4% sucrose gradient disc spinning at 10,000 rpm was used, and a 596-nm polystyrene calibration standard was injected prior to injection of the sample. For the microspheres, a 2-8% sucrose gradient disc spinning at 3,000 rpm was used, and 9-μm polystyrene calibration standard was injected prior to injection of the sample. Median weight average ($D_{50}$) particle size and coefficient of variation (CV) were calculated using instrument's algorithm.

Method for Measuring Gel Formation

Pre-weighted sample (200 to 4,000 g) were poured through 20/100/325-mesh stacked screens (in decreasing pore size from top to bottom); each screen was washed with copious amounts of water and gel was collected separately and dried at 150° C. for 30 min. The gel data is calculated as the weight ratio of the collected total dry gel in each screen over the total sample size:

gel %=dry gel/total sample×100; gel ppm=dry gel/total sample×$10^6$

Intermediate Example 1—Preparation of an Aqueous Dispersion of Crosslinked Multistage Microspheres An aqueous dispersion of acrylic oligomer seed (33% solids, 67 butyl acrylate/18 n-dodecyl mercaptan/14.8 methyl methacrylate/0.2 methacrylic acid) with a weight average median particle size ($D_{50}$) of 885 nm and a coefficient of variation of 5%, as determined by DCP, and a weight average molecular weight of 2532 g/mole was prepared substantially as described in U.S. Pat. No. 8,686,096, Examples 1 and 5 (col. 19 and 20).

Initiator emulsion was prepared by combining in a separate vial deionized water (4.9 g), Rhodacal DS-4 branched alkylbenzene sulfonate (DS-4, 0.21 g, 22.5% aq. solution), 4-hydroxy 2,2,6,6-tetramethylpiperidine (4-hydroxy TEMPO, 0.4 g, 5% aq. solution), t-amyl peroxy-2-ethylhexanoate (TAPEH, 5.42 g, 98% active), then emulsified for 10 min with a homogenizer at 15,000 rpm. The initiator emulsion was then added to the dispersion of the acrylic oligomer seed (4.2 g, 32% solids) in a separate vial and mixed for 60 min. A shot monomer emulsion (shot ME) was prepared in a separate flask by combining deionized water (109.5 g), Solvay Sipomer PAM-600 phosphate esters of PPG monomethacrylate (PAM-600, 2.18 g, 60% active), DS-4 (4.13 g, 22.5% solution), 4-hydroxy TEMPO (0.2 g), n-butyl acrylate (BA, 244.9 g), trimethylolpropane trimethacrylate (TMPTMA, 8.1 g) and allyl methacrylate (ALMA, 7.9 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and Shot ME was fed into the reactor over 15 min. After an induction period of 30 min, the resultant exotherm caused the reactor temperature to rise to 80° C. The particle size of the microspheres formed in this step as measured by DCP was 6.2 µm.

A first monomer emulsion (ME1, prepared by combining deionized water (328.5 g), PAM-600 (6.5 g), DS-4 (12.4 g, 22.5% solution), 4-hydroxy TEMPO (0.6 g of), BA (738.6 g), TMPTMA (24.4 g) and ALMA (23.7 g) was then fed into the reactor over 55 min. After a 20-min hold, $NH_4OH$ (0.8 g, 28% aq.) was fed into the reactor over 3 min. The particle size of the microspheres formed in this step as measured by DCP was 8.3 µm.

The reactor temperature was cooled to and maintained at 75° C., after which time $FeSO4.7H_2O$ (11 g, 0.15% aq.) and EDTA tetrasodium salt (2 g, 1% aqueous solution) were mixed and added to reactor. A second monomer emulsion (ME2) was prepared in a separate flask by combining deionized water (90 g), DS-4 (3.2 g, 22.5% solution), PAM-600 (2.20 g), methyl methacrylate (MMA, 238.1 g), ethyl acrylate (EA, 10.5 g), and acetoacetoxyethyl methacrylate (AAEM, 11.8 g). ME2, t-butyl hydroperoxide solution (t-BHP, 1.44 g (70% aq.) in 100 g water) and isoascorbic acid (IAA, 1.05 g in 100 g water) was fed into the reactor over 45 min. The residual monomers were then chased by feeding t-BHP solution (2.54 g (70% aq.) in 40 g water) and IAA (1.28 g in 40 g water) into the reactor over 20 min. The consequent dispersion was filtered through a 45-µm screen; gel that remained on the screen was collected and dried (435 ppm). The filtrate was analyzed for percent solids (32.0%), coefficient of variation (8.4%), and particle size (8.4 µm, as measured by DCP).

Preparation of Matte Finish Paints

In the following Examples, the latex used in Example 1 (Latex 1), EVOQUE™ 3150 Pre-Composite (a Trademark of The Dow Chemical Company or its Affiliates), is a blend of PEM-functionalized polymer particles with acorn morphology and latex particles with spherical morphology that are not functionalized with a phosphorus acid monomer; the latex used in Example 2 (Latex 2), EVOQUE™ 1161 Pre-composite, is a PEM-functionalized latex with spherical morphology; and the latex used in Comparative Example 1 (Latex 3) is RHOPLEX™ VSR 1049 Acrylic Emulsion (a Trademark of The Dow Chemical Company or its Affiliates), which is a latex with spherical morphology that is not functionalized with a phosphorus acid monomer.

Example 1—Preparation of a Pigmented Paint

EVOQUE 3150 Pre-Composite (178.0 g, 49 weight percent solids) and Intermediate 1 microspheres (160.4 g, 32 weight percent solids) were mixed together In a 0.50-L plastic container with an overhead stirring for 2 min; Kronos 4311 $TiO_2$ slurry (124.5 g, 77 weight percent solids) was then slowly added to the mixture, mixing was continued for 5 min. Texanol coalescent (7.0 g) and BYK-022 defoamer (0.13 g) were added slowly to the mixture, and mixing was continued for additional 2 to 3 min. The stirring speed was increased, and ACRYSOL™ RM-2020 Rheology Modifier (RM-2020, a Trademark of The Dow Chemical Company or its Affiliates, 11.8 g) was added slowly, followed by addition of ACRYSOL™ RM-8W Rheology Modifier (RM-8W, 1.3 g) and water (16.7 g) under high speed stirring to adjust the viscosity. The final pH was adjusted with ammonia (0.16 g, 28% aqueous) to ~9 and mixing was continued for an additional 5 to 10 min. The final mixture was a pigmented paint containing polymeric crosslinked organic microspheres.

Two additional paint formulations, Example 2 and Comparative Example 1, were prepared substantially as described in Example 1, except as shown in Table 1.

TABLE 1

Paint Formulations

| Example No. | 1 | 2 | Comp. 1 |
| --- | --- | --- | --- |
| Latex 1 (g) | 178.00 | | |
| Latex 2 (g) | | 190.82 | |
| Latex 3 (g) | | | 172.63 |
| Intermediate 1 (g) | 160.45 | 160.45 | 160.45 |
| Kronos 4311 $TiO_2$ (g) | 124.50 | 124.50 | 124.50 |
| Texanol Coalescent (g) | 7.00 | 10.10 | 4.38 |
| BYK-022 Defoamer (g) | 0.13 | 0.13 | 0.13 |
| RM-2020 (g) | 11.79 | 11.80 | 11.80 |
| RM-8W (g) | 1.30 | 1.20 | 1.20 |
| Water (g) | 16.70 | 2.20 | 19.00 |
| $NH_3$ (28% aq.) (g) | 0.16 | 0.16 | |

Scrub and hiding were compared for Example 1 and Comparative Example 1 paints, while stain resistance (mustard and red wine) were compared for Example 2 and Comparative Example 1 paints. The tests for scrub resistance, stain resistance, and hiding are described in the next sections.

Scrub Resistance Testing Method

Paints were draw down over Black Leneta vinyl charts using a 7-mil Dow application bar in duplicate and dried at 25° C., 50% relative humidity for 7 days. After drying, each chart was cut in half lengthwise to produce four test strips for each coating. Scrub medium was prepared by thoroughly mixing Leneta Standardized Abrasive Type Scrub Medium SC-2 (636 g), water (318 g), and Airex 901W defoamer (1.5 g). The scrub tests were performed on a machine equipped with Masterflex L/S tubing pump, a metal tray with a 0.5" by 10-mil brass shim, and nylon bristle brush. Each strip was placed on the metal tray over the shim with coated side up and secured with clamps. Scrub medium (10 g) was dispensed on the coating and the test was started with the counter set at zero. After each 400 cycles (before failure) an additional amount scrub medium (10 g) was dispensed before the test was continued. Scrub resistance was reported as the number of cycles needed to remove the coating fully in one continuous line across the 0.5" width of the shim. The mean values and standard deviations of the scrub cycles for the coatings were reported based on eight measurements per coating.

Stain Removal Test Method

Single drawdown of each coating was made on a Leneta black vinyl chart with a 7-mil Dow applicator and then dried for 7 days at 25° C. and 50% relative humidity. After the drying period, each stain was applied uniformly to fill in a separate test strip on the chart. After application, the stains were allowed to stand for 2 h and excess stain was removed with a paper towel. A sponge and Leneta non-abrasive scrub medium (10 g+15 g water) was used with a Gardco scrubbability tester and 1245 g weighted abrasion boat to clean the panel. Each panel was scrubbed for 100 cycles, rinsed thoroughly in clean tap water, and allowed to air dry. The dried panels were then rated in a scale of 0 to 100 for removal of each stain. Rating of 0 means the color was similar to the applied stain on the unclean section of panel. A rating of 100 indicates the stain was completely removed.

Hiding Measurement Test Method

Paints were draw down over Leneta RC-BC black release charts using a 1.5 mil Bird applicator. One thick film per paint was drawn down using a 25 mil draw down bar on a Leneta black vinyl chart. The paints were dried for 5 days at 25° C. and 50% relative humidity. After the drying period, a glass slide cover template of 3.25 inch×4 inch was placed on the film over Leneta RC-BC black release chart and scored with an Excel® knife to obtain the test area. Five reflectance values were measured using XRite reflectometer and the average value was recorded. The scored film test area was lifted and the weight was recorded on a tared aluminum pan using analytical balance. Average reflectance over thick film was also recorded from average of five reflectance values using XRite reflectometer. Hiding was reported in S/mil using the following equation:

$$S/mil = \frac{R}{X \times (1-R^2)} \times \ln\left(\frac{1-(R_B \times R)}{1-\frac{R_B}{R}}\right)$$

Where X is the average film thickness over Leneta RC-BC black release chart (thin film), R is the average reflectance of the film on a Leneta black vinyl chart (thick film), and $R_B$ is the average reflectance over black of the thin film. X can be calculated from the weight of the paint film ($W_{pf}$), the density (D) of the dry film, and the film area.

Table 2 shows the scrub resistance and hiding (S/mil) data generated for Example 1 and Comparative Example 1 paints.

TABLE 2

Scrub Resistance and Hiding Data

| Sample | Scrub Cycles (Avg ± std. dev.) | S/mil (Avg ± std dev.) |
| --- | --- | --- |
| Ex. 1 | 733 ± 91 | 4.92 ± 0.10 |
| Comp. Ex. 1 | 476 ± 28 | 4.20 ± 0.03 |

Table 3 shows mustard and red wine stain resistance and hiding data generated for Example 2 and Comparative Example 2.

TABLE 3

Stain Resistance and Hiding Data

| Sample | Mustard Resistance | Red Wine Resistance | S/mil (Avg ± std dev.) |
| --- | --- | --- | --- |
| Ex. 2 | 70 | 90 | 5.13 ± 0.08 |
| Comp. Ex. 1 | 40 | 80 | 4.20 ± 0.03 |

In each instance, hiding is significantly improved for a composition containing a PEM-functionalized latex. The data also show that scrub is markedly improved in one instance, while mustard and red wine stain resistance are improved in another. While no single phosphorus acid functionalized polymer particle morphology (for example, acorn or spherical morphology) was shown to improve stain and scrub across the board, it is evident, that such improvements can be achieved by varying blends of different latex morphologies in combination with the polymeric organic microspheres.

The invention claimed is:

1. A composition comprising an aqueous dispersion of a) phosphorus acid functionalized latex polymer particles; b) $TiO_2$ particles; c) polymeric organic microspheres; and d) a rheology modifier; wherein
    the concentration of the phosphorus acid functionalized latex polymer particles is in the range of from 4 to 35 weight percent, based on the weight of the composition;
    the average particle size of the phosphorus acid functionalized latex polymer particles is in the range of from 80 nm to 500 nm;
    the concentration of the polymeric organic microspheres is in the range of from 4 to 30 weight percent, based on the weight of the composition;
    the average particle size of the organic microspheres is in the range of from 1 μm to 20 μm;
    the rheology modifier is present at a concentration in the range of from 0.1 to 5 weight percent, based on the weight of the composition;
    the $TiO_2$ is present at a concentration in the range of from 14 to 32 weight percent based on the weight of the composition;
    at least 20 weight percent of the phosphorus acid functionalized latex polymer particles are adsorbed to the $TiO_2$ particles; and
    the polymeric organic microspheres are not film-forming at ambient temperature; wherein the composition is a pigmented matte coating composition.

2. The composition of claim 1 wherein the concentration of the phosphorus acid functionalized latex polymer particles is in the range of from 10 to 30 weight percent, based on the weight of the composition;
    the concentration of the polymeric organic microspheres is in the range of from 8 to 25 weight percent, based on the weight of the composition;
    the average particle size of the polymeric organic microspheres is in the range of from 2 μm to 15 μm and the polymeric organic microspheres have a coefficient of variation of less than 20%;
    the $TiO_2$ is present at a concentration in the range of from 16 to 28 weight percent based on the weight of the composition.

3. The composition of claim 2 wherein the phosphorus acid functionalized latex polymer particles further comprise from 0.05 to 12 weight percent structural units of acetoacetoxyethyl methacrylate or diacetone acrylamide, based on the weight of the polymer particles and the polymeric organic microspheres.

4. The composition of claim 2 which further comprises from 0.1 to 10 weight percent, based on the weight of the polymer particles and the polymeric organic microspheres of a dihydrazide crosslinking agent selected from the group consisting of adipic acid dihydrazide, carbodihydrazide, sebacic acid dihydrazide, valine dihydrazide, isophthalic dihydrazide, and icosanedioic hydrazide; wherein the phosphorus acid functionalized polymer particles further comprise 0.5 to 5 weight percent structural units of diacetone acrylamide, based on the weight of the polymer particles and the polymeric organic microspheres.

5. A composition comprising an aqueous dispersion of a) phosphorus acid functionalized latex polymer particles; b) $TiO_2$ particles; c) polymeric organic microspheres; and d) a rheology modifier; wherein the concentration of the phosphorus acid functionalized latex polymer particles is in the range of from 4 to 35 weight percent, based on the weight of the composition;

the average particle size of the phosphorus acid functionalized polymer particles is in the range of from 80 nm to 500 nm;

the concentration of the polymeric organic microspheres is in the range of from 4 to 30 weight percent, based on the weight of the composition;

the average particle size of the organic microspheres is in the range of from 1 μm to 20 μm;

wherein the phosphorus acid functionalized latex polymer comprises 0.05 to 12 weight percent structural units of acetoacetoxyethyl methacrylate or diacetone acrylamide, based on the weight of the polymer particles and the polymeric organic microspheres;

the rheology modifier is present at a concentration in the range of from 0.1 to 5 weight percent, based on the weight of the composition;

the $TiO_2$ is present at a concentration in the range of from 14 to 32 weight percent based on the weight of the composition;

at least 20 weight percent of the phosphorus acid functionalized latex polymer particles are adsorbed to the $TiO_2$ particles; and the polymeric organic microspheres are not film-forming at ambient temperature; wherein the composition is a pigmented matte coating composition.

6. The composition of claim 5 wherein the phosphorus acid functionalized latex polymer particles comprise structural units of diacetone acrylamide, and wherein the composition further comprises 0.1 to 10 weight percent, based on the weight of the polymer particles and the polymeric organic microspheres of a dihydrazide crosslinking agent selected from the group consisting of adipic acid dihydrazide, carbodihydrazide, sebacic acid dihydrazide, valine dihydrazide, isophthalic dihydrazide, and icosanedioic hydrazide.

7. The composition of claim 6 wherein the polymeric organic microspheres are functionalized with from 0.05 to 5 weight percent, based on the weight of the microspheres, of structural units of the compound of Formula I:

$$\left[ \begin{array}{c} R \\ \end{array} \diagup\!\!\!\!\diagup \left( O \diagdown\!\!\diagup\!\!\diagdown_{R^2}^{R^1}\right)_m \!\!\!\left( O \diagdown\!\!\diagup\!\!\overset{O}{\underset{\phantom{O}}{\|}}\!\!\!C\!\!-\!\!R^3 \right)_n \!\!\!O\!\!-\!\!\overset{O}{\underset{\|}{P}}(OH)_y \right]_x \quad I$$

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5 with the proviso that when m is 1, n is 1 to 5; x is 1 or 2; and y is 1 or 2; and x+y=3.

8. The composition of claim 7 wherein n is 0, x is 1, and y is 2; or n is 1; m is 1; R is $CH_3$; $R^1$ and $R^2$ are each H; $R^3$—$(CH_2)_5$—; x is 1 or 2; y is 1 or 2; and x+y=3.

9. The composition of claim 6, wherein a) the polymeric organic microspheres are functionalized with from 0.1 to 3 weight percent, based on the weight of the polymeric organic microspheres, structural units of the compound of Formula IV:

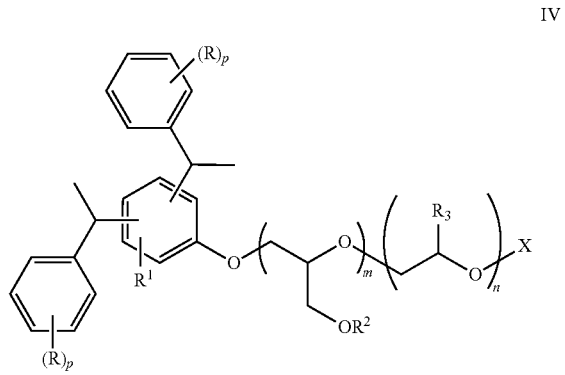

where each R is independently $C_1$-$C_4$-alkyl; $R^1$ is H, $CH_2CR=CH_2$, $CH=CHCH_3$, or 1-phenethyl-$(R)_p$; each $R^2$ is independently H, allyl, methyl, acrylate, methacrylate, or —$CH_2CHR^3OX$; each $R^3$ is independently H, methyl, or ethyl; m is 0 to 5; n is 6 to 40; p is 0, 1 or 2; and O—X is hydroxyl, methoxyl, a sulfate or a phosphate; or b) the composition further comprises from 0.1 to 3 weight percent, based on the weight of the polymeric organic microspheres, of the compound of Formula IV.

10. The composition of claim 6 which further comprises the compound of Formula V:

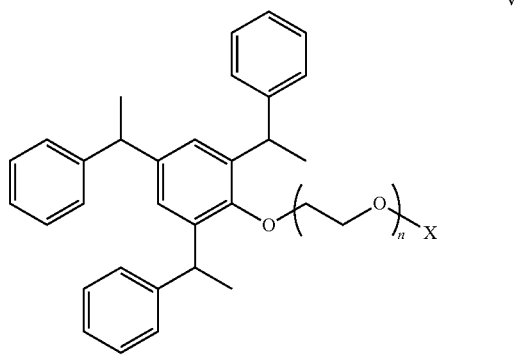

where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$.

11. The composition of claim 6, wherein the polymeric organic microspheres are functionalized with from 0.01 to 5 weight percent, based on the weight of the polymeric organic microspheres, of structural units of the compound of Formula VI:

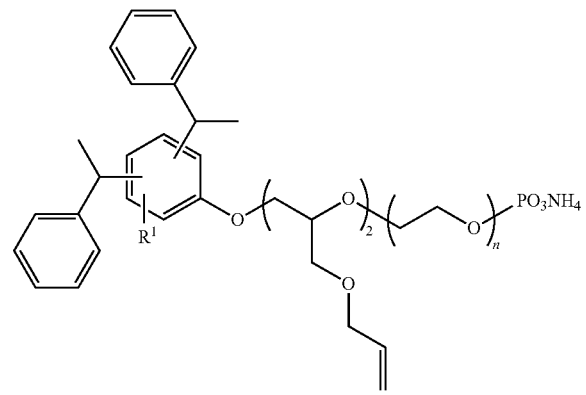

where n is 12 to 18; or the compound of Formula VII:

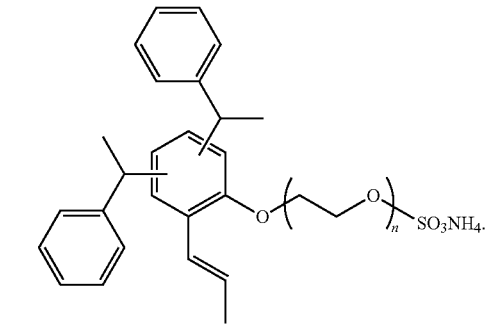

12. The composition of claim 6 which comprises a substantial absence of inorganic extenders having a refractive index in the range of 1.0 to 1.9.

* * * * *